United States Patent [19]

Hill

[11] 4,138,660
[45] Feb. 6, 1979

[54] AUTOMATED FLASH-BANG METHOD AND APPARATUS FOR DETERMINING LIGHTNING STROKE DISTANCES

[75] Inventor: Robert D. Hill, Montecito, Calif.

[73] Assignee: The United States of America as represented by the Secretary of the Navy, Washington, D.C.

[21] Appl. No.: 833,325

[22] Filed: Sep. 14, 1977

[51] Int. Cl.² .............................................. G01S 5/18
[52] U.S. Cl. .............................. 340/16 R; 343/112 D
[58] Field of Search ................... 340/16 R; 343/112 D

[56] References Cited

U.S. PATENT DOCUMENTS

| | | | |
|---|---|---|---|
| 1,893,337 | 1/1933 | Patterson | 343/112 D |
| 2,823,974 | 2/1958 | Daniels | 340/16 R X |
| 3,205,475 | 9/1965 | Foss | 340/16 R X |
| 3,723,960 | 3/1973 | Harris | 340/16 R X |

*Primary Examiner*—Richard A. Farley

*Attorney, Agent, or Firm*—Richard S. Sciascia; Paul N. Critchlow

[57] ABSTRACT

Four microphones are disposed one at each corner of a square or rectangular configuration located near a base station from which the lightning distance is to be measured. A light detector also is located near the base station. When lightning occurs, the light and sound waves are detected and passed in pulse form over separate channels to a computer. The time intervals between lightning and sound in each channel are measured, stored and used to calculate the slant range distance of each microphone from the lightning event. Using the slant range distance values and the known spacing values of the rectangular configuration, a computer provides the desired distance value which, for present purposes, is the horizontal distance of the closest microphone to a ground point perpendicularly beneath the lightning event. The azimuth of the ground point from the closest microphone can be determined by a simple calculation using the ground point distance value.

7 Claims, 5 Drawing Figures

XOY IS GROUND PLANE

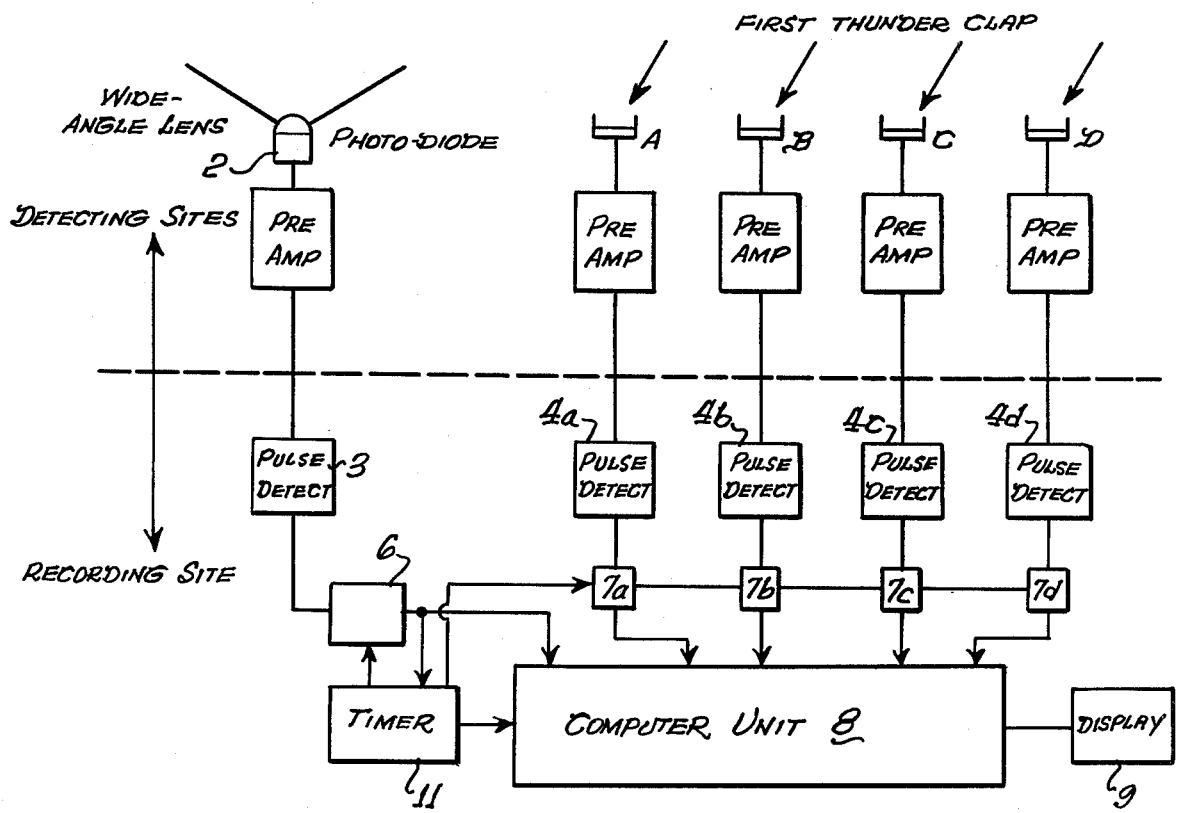

AUTOMATED FLASH-BANG METHOD AND APPARATUS FOR DETERMINING LIGHTNING STROKE DISTANCES

BACKGROUND OF THE INVENTION

The present invention relates to methods for determining lightning stroke distances and, in particular, to the automation of such methods.

Because of the dangers and damaging effects of lightning, it obviously would be beneficial to have warning systems providing automatic alerts. For example, ammunition loading or assembly depots, as well as fuel-handling facilities clearly could benefit from such protection. Also, lightning can upset computer memories and disrupt the proper operation of telecommunictions and integrated circuit systems. However, as far as is known, simple and reliable automated systems presently are not available.

It would seem that the provision of such systems would be a relatively simple matter. For years human observers have figured the closeness of the flashes by counting the time interval between the flash and the sound. Since sound travels at approximately 340 meters/second, the distance value is readily available. Consequently, at first glance, automation of this 'flash-bang' technique simply would involve only the use of readily-available acoustic and optical sensors coupled with a timer and a simple calculator. However, when the problems are analyzed, the solutions become somewhat complicated particularly if a relatively high degree of precision or reliability is desired. Thus, with regard to reliability, the human observer technique is somewhat uncertain in that there is no guarantee that the 'bang' is the first sound produced by the lightning. Nor is there any certainty that the bang is even associated with one particular flash. Further, although the observer usually assumes that his calculation represents a horizontal or ground plane distance, the fact is that the sound is emanating from a point in the sky and that the observer actually is calculating a slant range.

More specifically, if the observer is basing the calculation upon a loud thunder clap, as contrasted with an initial rumble noise, it is well known that the origin of the clap is a shock wave propagated from a section of a lightning channel which is approximately perpendicularly oriented to the line of propagation of the sound to the observer (or the sensor). Consequently, since the origin may be at a considerable height above the ground, its slant range becomes at best a questionable estimate of the horizontal ground distance. Also, although the initial rumble rather than the load clap probably is the closest part of a lightning channel, often it is difficult to associate the rumble with a particular lightning event. The first load clap after sighting a cloud-to-ground lightning flash is more reliable. Again, however, studies have shown that such load claps may follow the initial sound by as much as 14 seconds. Thus, an early study by W. J. Remillard "Acoustics of Thunder" (Harvard University Tech, Memo #14 1960), plotted the numbers of thunder events against the time between the first thunder sound and the first loud clap after a cloud-to-ground flash was seen. The plot clearly indicates that the first loud clap may follow the initial thunder cloud, presumably the closest part of the channel, by rather long periods of time extending, as stated, up to 14 seconds. A flash-bang determination in such a case would locate the channel at a distance of approximately 4 to 5 miles further than it actually occurred relative to the observer.

Automatic lightning warning systems which resolve these and other problems in a simple and effective manner apparently have not been developed or, at least, as far as is known, are not available. Any such system at a minimum should provide a close estimate of the horizontal distance between points having a high probability of a lightning strike and it should assure to the maximum extent possible that the observed lightning event is the origin of the sound.

BRIEF DESCRIPTION OF THE DRAWINGS

The present invention is illustrated in the accompanying drawings of which:

FIG. 3 is a diagram illustrating an azimuth identication procedure for the present system;

FIG. 4 is a circuit block diagram of the present system, and

DETAILED DESCRIPTION OF THE INVENTION

The present invention uses the so-called 'flash-bang' technique based upon time intervals between thunder and lightning events. Also, it employs conventional optical and acoustical sensors to receive the events and provide pulsed signals for the essential time sequence measurements. Basically, it is an automatic warning system in which these sensors are deployed in a particular arrangement which increases the reliability of the calculations upon which the warnings are based.

Figure 1:
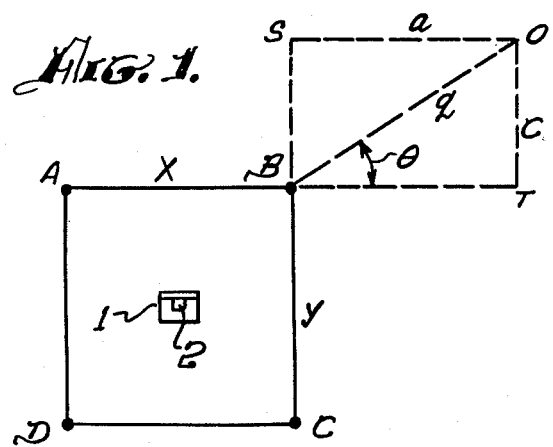
FIG. 1 is a schematic lay-out of a particular sensor arrangement used to accomplish the purposes of the present invention.
Figure 5:
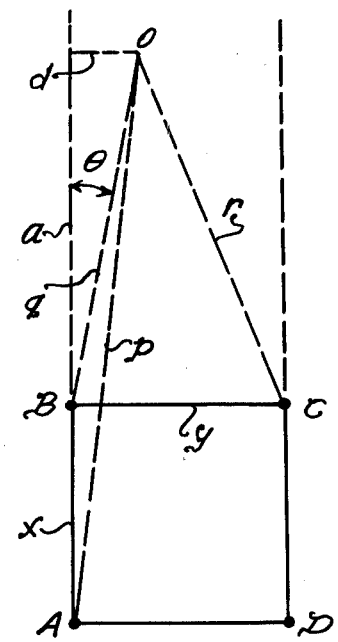
FIG. 5 is another geometrical plot illustrating a procedure applicable to a special range-resolution situation.

In FIG. 1, numeral 1 designates the particular site or station to be protected. For descriptive purposes, it will be referred to as the ground or base station. Lightning events are received by an optical detector 2 located at station 1 or, at least, somewhere in its vicinity. Because of the speed of light, the actual location of the optical detector is not critical and can be pretty much a matter of convenience. As to form, detector 2 may be an all-sky photometer using mirrors or a lens to apply the received light to a suitable photodiode or the like. All-sky detectors are well-known in the art and, in fact, instruments have been developed for day as well as night use. One such detector is described by Dr. R. Westervelt and H. Hoerlin in the "Proceedings of the Institute of Electrical and Electronic Engineers" Vol. 53, page 2067, (1965). This device is an all-sky photometer using an Everett, Germerhausen and Greer (E.G.G.) silicon photodiode. For night operation, the detector can be modified in the manner suggested by V. Suka "Electronic Optical System for Lightning Research" Arkiv For Geofysik, Vol. 5 page 569 (1969). In general, it uses two different metal film mirrors, gold and aluminum, designed, respectively, for the red to infrared and the violet or visible parts of the spectrum. The use of such detectors presently is contemplated. Other types of detectors for determining the time of the lightning flash event, such as radio spherics detectors, may also be used to determine the instant of the flash.

A particular feature of the invention is that sound detectors A, B, C and D (FIG. 1) are located near ground station 1 in a rectangular configuration. These detectors which may be simple microphones obviously function to receive the thunder and generate a signal for comparison with the lightning detector signal in a simple calculator or computer that will be described. The rectangular configuration is, as indicated, a significant factor. However, insofar as the present invention is concerned, the term 'rectangular' is intended to include square configurations as well as the classic rectangular geometry having unequal sides.

The 'nearness' of the rectangular configuration to ground station 1 again is a relative matter which must take into account errors introduced in the calculations if the distance is too great. Since sound travels at about 340 meters/second, the location can introduce material error although, of course, the distance will be a known dimension that permits correction. Preferably, the detectors are as close to the station as conveniently possible. However, they also must be spaced one from the other a minimum distance which may be in the order of several hundreds of meters or, approximately, 1/5 mile on the side. These separations are not critical except that the time required by sound to cross them must not be too small compared to the time resolutions of the pulses registered by the detectors. Optimization of the separations readily can be determined. If desired, the square or rectangle also may be optimized to the direction of the prevailing approach of storms. As shown in FIG. 1, the arrangement places the detectors at the corners of the rectangle.

The form of the acoustic dectectors is not specific to the present invention and a number of acceptable devices are described in the scientific literature. For example, D. J. Latham, in his M.S. thesis entitled "A Study of Thunder from Close Lightning Discharges" (New Mexico Institute of Mining and Techniology, June 1964), and A. A. Few, in his Ph.D thesis entitled "Thunder" (Rice University, November 1968), both have described capacitor microphone detectors sensitive to very small acoustic overpressures over a range of frequencies from a few to several thousand hertz. For the purpose of this invention, however, the overpressure sensitivity and frequency range of the detector are not critical. In fact, because the invention preferably is based on the detection of a loud first-clap signal which is well above noise levels, as well as rumbling thunder levels, even a non-linear self-rectified detector, such as was used by Bhartendu in his Ph.D. thesis entitled "Acoustics of Thunder" (University of Saskatchewan, 1964), would be adequate.

Figure 2:
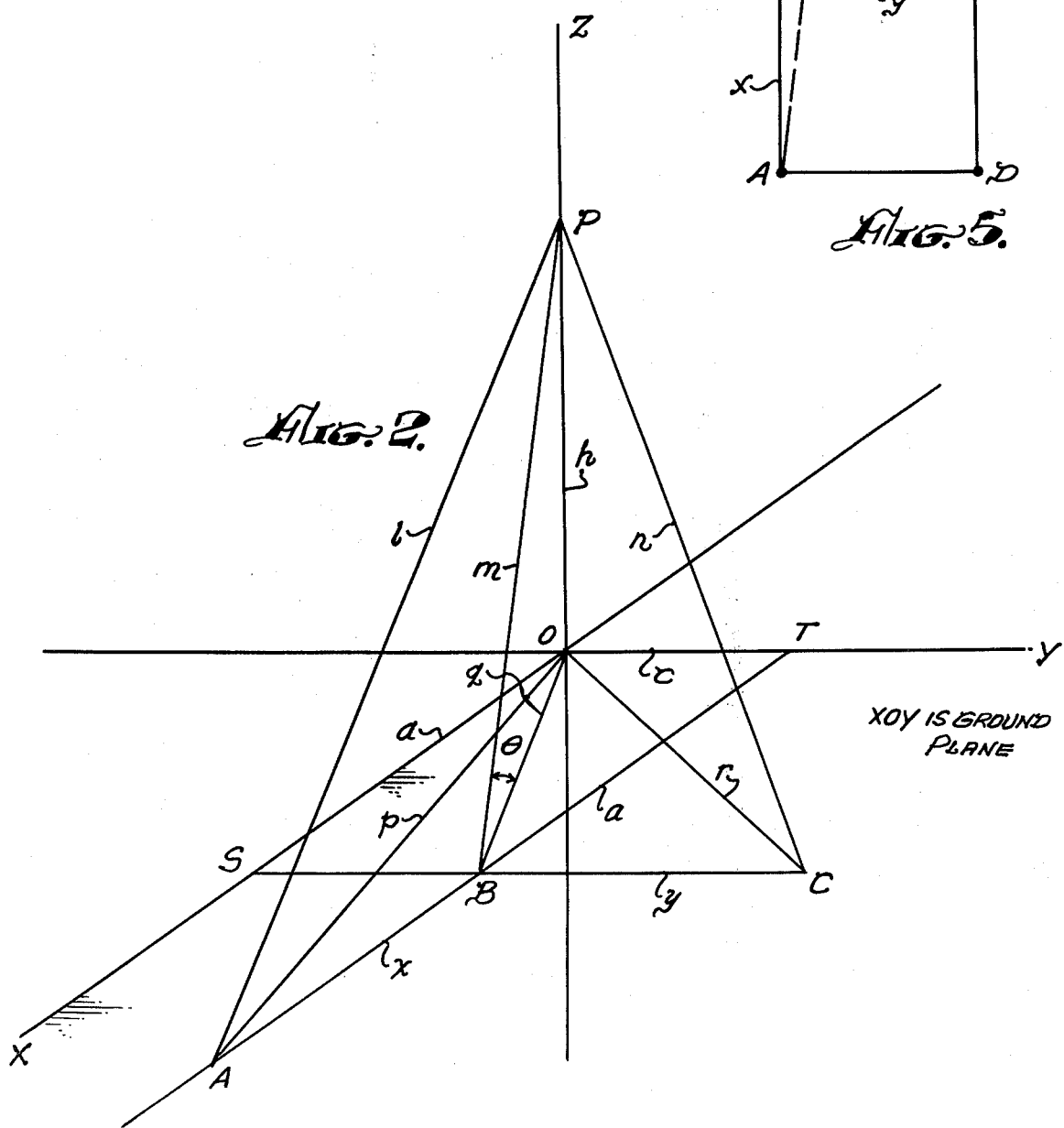
FIG. 2 illustrates the geometry of propagation and derivation of the lightning range.

FIG. 2 shows the geometry for the derivation of range for a particular lightning channel P which is assumed to be the origin of a thunder clap detected at sites A, B and C. The plot, as will be seen, is three dimensional on axes X, Y and Z. XOY is the ground plane. Points A, B and C represent detectors stations A, B and C of FIG. 1. In FIG. 2 they are distributed at distances or separations 'x' and 'y' on two lines perpendicular one to the other. According to the principles of the present invention, computations based upon the FIG. 2 geometry utilize only three of the four detector outputs i.e. A, B and C with the fourth output D being discarded. Any three outputs may be used. The ones actually used will be the first three to fire with the fourth discarded. Due to the rectangular configuration, the first to fire will be the one closest to point P or, in other words, having the shortest slant range. If B, for example, is first, the diagonally opposite detector D will be last and will be discarded. The reverse, of course, is true if D is the first to fire.

As shown in FIG. 2, B is first to fire and has the shortest slant range. The horizontal or ground plane range of the lightning flash originating at P is identified as 'q' which is the horizontal distance from B to a point on the ground immediately under channel section P. in the derivation of range it is assumed that the thunder clap is limited to channel P. This assumption is somewhat validated by the established and previously stated theory that a thunder clap is caused by a shock wave propagated from a section of a lightning channel which is approximately perpendicular oriented to the line of propagation to the detector. Thus channel P is a particular channel that is approximately perpendicular to slant ranges l, m and n in order for it to occur at A, B and C.

Point O simply is a point perpendicularly below P and, of course, is not necessarily the point struck by the lightning. Cloud-to-ground lightning strokes generally are somewhat perpendicular although, of course, many variations occur. The use of point O therefore is based upon an assumption of probability. The actual striking point of cloud-to-ground flashes is totally unpredictable. As will be seen, the use of point O not only is based upon probability factors, it further provides the geometry for the relatively simple range calculations.

FIG. 2 perhaps is more easily understood with reference to the dotted line projections shown in FIG. 1. Thus, point O in FIG. 1 again is the point perpendicular to channel P. The first detector to fire again is detector B and 'q' is the ground plane distance to point O or, in other words, the range to be determined. Distance 'a' is projected on the X axis and 'c' on the Y axis. Angles SBA and TBC are right angles both in FIGS. 1 and 2. 'x' and 'y' in both FIGS. represent the spacing or separations of detectors ABC and, of course, are known demensions.

To determine distance 'q' it is necessary only to measure the time intervals or delays between the receipt of the lightning and the receipt of the thunder. Using the time interval data, the slant range distance values for detectors A, B and C readily can be provided. These distances, as shown in FIG. 2, are 'l' 'm' and 'n'. Using values 'l', 'm' and 'n' and values 'x' and 'y', which are the known separation distances of A, B and C, the desired range 'q' can be calculated from the following mathematical expression:

$$q^2 = \frac{(l^2 - m^2 - x^2)^2}{4x^2} + \frac{(n^2 - m^2 - y^2)^2}{4y^2} \quad \text{Equation \#1}$$

The mathematic derivation of Equation #1 is based upon Cartesian coordinates as shown in FIG. 2. It is as follows:

(a) $h^2 + p^2 = l^2$
(b) $h^2 + q^2 = m^2$
(c) $h^2 + r^2 = n^2$
From (a), (b) and (c)
$q^2 - r^2 = m^2 - n^2$
$p^2 - q^2 = l^2 - m^2$
Equating the above:
$m^2 - n^2 = c^2 - (y + c)^2$
$l^2 - m^2 = (x + a)^2 - a^2$
Substituting into (e)

$$q^2 = \frac{(l^2 - m^2 - x^2)^2}{4x^2} + \frac{(n^2 - m^2 - y^2)^2}{4y^2} \quad \text{Equation \#1}$$

(d) $p^2 = (x + a)^2 + c^2$
(e) $q^2 = a^2 + c^2$
(f) $r^2 = a^2 + (y + c)^2$
From (d), (e) and (f)
$q^2 - r^2 = c^2 - (y + c)^2$
$p^2 - q^2 = (x + a)^2 - a^2$ $c = (n^2 - m^2 - y^2)/2y$
$a = (l^2 - m^2 - x^2)/2x$ Since all quantities in Equation #1 are squared, 'q' has a positive value.

To determine the location of channel P, the angle $\theta$ can be determined from the relationship: $\theta = \cos^{-1}(a/q)$ This determination obviously requires the determination of value 'a' which again is readily found from the known measurement of: $a = (l^2 - m^2 - x^2)/2x$ The height 'h' of channel P is given by: $h^2 = m^2 - q^2$ (Equation (b) supra).

Although the value of angle $\theta$ is readily determined, it will be noted that this angle could lie in any of the four quadrants identified in FIG. 3 as I, II, III and IV. The correct quadrant very simply is identified by determining which of detectors A, B, C, D, is the first to fire. Angle $\theta$, as given in FIG. 2, is formed from a right-hand system of axes once the correct quadrant is identified.

FIG. 4 is a block diagram of the present automatic flash-bang measuring system. The optical and acoustic detectors are the same as those shown in FIG. 1. Signals derived from the detectors are amplified and passed to pulse detectors 3, 4a, b, c and d (FIG. 4) located remotely, if desired, at a recording site. The pulse detectors, in turn, pass the signals through gates 6, 7a, b, c, d to a computer unit 8 having an output display 9 and a time gate 11. Upon receipt of a light pulse signal, gate 6 passes the signal to a timer 11 and to the computer. Timer 11 essentially can be any suitable pulse-generating clock mechanism which, in the first instance, functions to enable computer 8. When enabled, light and sound pulses are received by the computer and the time intervals between the receipt of the light pulse and the acoustic pulse of each sound detector are measured to provide the bases for determining slant range values l, m and n. According to the logic recommended for the computer algorithm, the first three detectors that fire are used with the fourth discarded. However, the preferred logic also should be such that if, for example, detector B fires first, the last to fire must be detector D. If not, the data is rejected. Other logic should allow for the arrival of pulses in two detectors simultaneously within the resolving time of the detectors. Again, data is rejected if the signals from the second two detectors are not simultaneous. If three or four pulses arrive simultaneously, the source clearly is overhead.

Timer 11 enables computer 8 for a period of time which is determined by the maximum range at which thunder reliably can be detected. Conservatively, this distance is about 5-10 miles. Based upon the speed of sound, the maximum delay or interval then is of the order of 25-50 seconds. The computer consequently is enabled for a period of less than a minute or, for example, 50 seconds. After this waiting time, its registers will be cleared and reset by timer 11 to receive inputs from subsequent events.

It also must be recognized that lightning events subsequent to the one being processed may occur within the 50 second period. To prevent confusion and error, gates 6 and 7a, b, c, d are controlled, preferably by timer 11, to close after their receipt and gating of the first acoustic and light signals. The gates remain closed to block subsequent pulses during the 50 second enablement of computer 8 following which they are reset for gating subsequent events. Implementation of the gates as well as the computer is a matter well within the present state of art. Resettable gates and registers, of course, are widely used. Also, various devices capable of providing the time measurements are well known. Computations required of the computer itself can be accomplished by any general purpose computer although, in view of the fundamental nature of the calculations, a relatively simple special purpose computer may be more economical.

The system which has been described is applicable to practically all operational situations. However, it is recognized that some additional refinements may be desirable if its working program is to cover or exhaust every conceivable situation. In particular, there are two particular situations which perhaps should be considered. First, there is one in which point O lies on the projection of the line of two detectors, such as A and B. In other words, referring to FIG. 1, the value 'q' is equal to 'a' which is the projection of AB. Resolution of 'q' for this particular situation is, if anything, simplified since, as will be apparent, $$q = a = \frac{(l^2 - m^2 - x^2)}{2x}.$$

Computations carried out in this special case should come up with the term $(n^2 - m^2 - y^2) = 0$.

A second special situation is demonstrated by the FIG. 4 plot. In this situation, as will be seen, $(n^2 - m^2 - y^2)$ could be negative. In FIG. 4, '0' lies between the projections of detector line AB and DC so that, in effect, it is lying in an area between B and C of FIG. 3 and not within any of the FIG. 3 quadrants. To apply the quadrant method of FIG. 3 to the full azimuth, this situation requires special consideration.

As to its resolution, it will be found from working the equations already described that:

$$q^2 = \frac{(l^2 - m^2 - x^2)^2}{4x^2} + \frac{(n^2 - m^2 - y^2)^2}{4y^2}.$$

Thus, the result is the same as before. However, it also is found that $$d = \frac{(m^2 + y^2 - n^2)}{2y}$$

so that $(n^2 - m^2 - y^2)$ is negative. The problem then is to determine that the angle $\theta$ in this case is negative and that 0 lies between the lines as shown.

To resolve these matters, the computer computes $\sin \theta$ as follows:

$$\sin \theta = \frac{d}{q} = \frac{(n^2 - m^2 - y^2)}{q},$$

i.e. a negative value. The negative value places 0 between the lines at angle $\theta$.

The two special situations just described can be reliably resolved if the measurements of the system are accurate. However, inaccuracies perhaps should be considered since, as is known, the lightning channel curves rather radically. A logic can be developed which accomodates these special situations as well as the inaccuracies. For example, 'q' be computed according to Equation #1. If the term turns out to be 'zero', it is concluded that $\theta = 0$ and that point 0 lies along the projection of AB (FIG. 4). If the term $(n^2 - m^2 - y^2)$ comes out negative, 'q' still can be computed correctly by including the two squared terms $(l^2 - m^2 - x^2)$ and $(n^2 - m^2 - y^2)$. Also, $\theta$ will be computed correctly as equal to $\cos^{-1}(a/q)$. However, because of the negativity, a further test is made to determine if $$\sin \theta = \frac{(n^2 - m^2 - y^2)}{q}$$

is positive or negative. If positive, $\theta$ lies in the quadrant defined by the 'first to fire' detector. If negative, it lies at negative angles outside the quadrant and 0 is between two of the detectors. Actually, the detectors are so close together ($\sim$1/5 mile) that it may be acceptable to assume that negative angles of $\theta$ are equal to zero relative to a particular quadrant. However, when pont 0 is close to the detectors, $\theta$ becomes large and the assumption may not be good enough.

The operation of the present system has been fully described and should be readily understandable. Fundamentally, it establishes a particular geometrical configuration for the essential sensors and, because of the configuration, it can provide data that readily lends itself to simple computations yielding a reliable horizontal range value for the lightning channel. Automation of the so-called 'flash-bang' technique consequently can be achieved rather economically and, considering the unpredictable nature of lightning events, with a relatively high degree of validity.

A particular implementation of the system also has been described although, as will be appreciated, modifications or refinements both of the system and its instrumentation are contemplated. For example, systems can be set-up which, instead of using a first 'loud clap' as a measurement basis, use the first rumbling thunder noise. If so, the sound detectors may require lower thresholding and their sensitivity may become a factor.

Variations in the computer techniques are anticipated and, of course, the provision of the working program is a matter that is subject to a variety of approaches providing it utilizes the data and equations provided by the geometrically-arranged sensors. In view of the present state of the computer art, both the hardware used in the system and the programming clearly should present no difficulties. In fact, as will be appreciated, the function of the computer is to permit the automation, and, if automation is not a factor, the computations can be performed in other manners.

Obviously many modifications and variations of the present invention are possible in the light of the above teachings. It is therefore to be understood that within the scope of the appended claims the invention may be practiced otherwise than as specifically described.

I claim:

1. A flash-bang method of determining the ground plane distance of a lightning event from a selected ground station comprising:
   detecting a lightning flash event received at a location near said selected station,
   locating at least four sound-detecting stations in a rectangular arrangement of known dimensions disposed near said selected station,
   detecting thunder sound events received at each of said sound-detecting stations,
   measuring the time difference between receipt of the lightning event and receipt of the sound event for each sound-receiving station,
   deriving from said time difference measurements the slant range distance values of each sound-receiving station, and
   deriving said ground plane distance by employing said slant range values and said known rectangular dimensions to determine the horizontal distance value of a particular sound-receiving station from a particular point locted on the ground perpendicularly beneath said lightning flash event.

2. The method of claim 1 further including the step of deriving the azimuth angle of the lightning event by employing said horizontal distance value to determine the azimuth angle between said particular station and said particular point.

3. The method of claim 2 wherein the derivation of said ground plane distance utilizes only the three shorter slant range distances along with said rectangular dimensions and the said particular sound-receiving station is the one having the shortest slant range distance.

4. A flash-bang system for determining the ground plane distance of a lightning event from a selected ground station comprising:
   means disposed near said selected station for receiving a lightning flash event and for responsively generating a output signal,
   at least four acoustic receiver means disposed each at a corner of a rectangle of known dimensions disposed near said selected station, said means each receiving a thunder sound event and responsively generating a sound-pulse output signal,
   means for computing the time intervals between the generation of said output signal and the generation of each of said output signals, and
   circuit means for detecting and applying said flash event and sound output signals to said computer means,
   said ground plane distance being computed from said time intervals and said known rectangular dimensions.

5. The system of claim 4 wherein said computing means further derives the azimuth of said lightning flash event, said azimuth being computed from said ground plane distance value.

6. The system of claim 4 further including timer means coupled to said computing means for resettably enabling the computer means for a limited period of time following the receipt of said lightning flash event.

7. The system of claim 6 wherein said circuit means includes:
   output pulse detector means for said flash event and sound pulse signals,
   electrically-conductive lines coupling each detector means to said computer means, and
   normally-open gate means in each of said lines, said timer means closing said gate means after receipt of a first flash event and reopening said gate means at the termination of said limited period of time whereby pulses subsequent to said first flash event are blocked while said computing means is enabled.

* * * * *